(12) United States Patent
Stute

(10) Patent No.: US 8,106,882 B2
(45) Date of Patent: Jan. 31, 2012

(54) HAND-WORN INTERFACE DEVICE

(76) Inventor: Joseph Stute, Grover Beach, CA (US)

(*) Notice: Subject to any disclaimer, the term of this patent is extended or adjusted under 35 U.S.C. 154(b) by 614 days.

(21) Appl. No.: 12/291,269

(22) Filed: Nov. 7, 2008

(65) Prior Publication Data

US 2010/0117953 A1    May 13, 2010

(51) Int. Cl.
*G09G 5/00* (2006.01)
(52) U.S. Cl. ......................... 345/156; 345/161
(58) Field of Classification Search ................ None
See application file for complete search history.

(56) References Cited

U.S. PATENT DOCUMENTS

| | | |
|---|---|---|
| 3,835,453 A | 9/1974 | Narayanan |
| 4,414,537 A | 11/1983 | Grimes |
| 4,517,424 A | 5/1985 | Kroczynski |
| 4,954,817 A | 9/1990 | Levine |
| 5,063,376 A | 11/1991 | Chang |
| 5,175,534 A | 12/1992 | Thatcher |
| 5,706,026 A | 1/1998 | Kent |
| 5,940,066 A | 8/1999 | Weinblatt |
| 6,712,538 B1 | 3/2004 | Green |
| 6,943,776 B2 | 9/2005 | Ehrenburg |
| 2008/0132334 A1* | 6/2008 | Nonaka et al. .................. 463/37 |

* cited by examiner

*Primary Examiner* — Muhammad N Edun
(74) *Attorney, Agent, or Firm* — Andrew Y. Schroeder; Law Office of Andrew Y. Schroeder

(57) ABSTRACT

A Hand-Worn Ambidextrous Interface Device for use with interfacing with a computer or similar device includes in some preferred embodiments a Housing, an Angled Face, a plurality of Switches and a Removable Three-Axis Joystick. In some preferred embodiments the Removable Three-Axis Joystick may control the cursor on the monitor or screen of the computer or related device to which it is communicating.

8 Claims, 7 Drawing Sheets

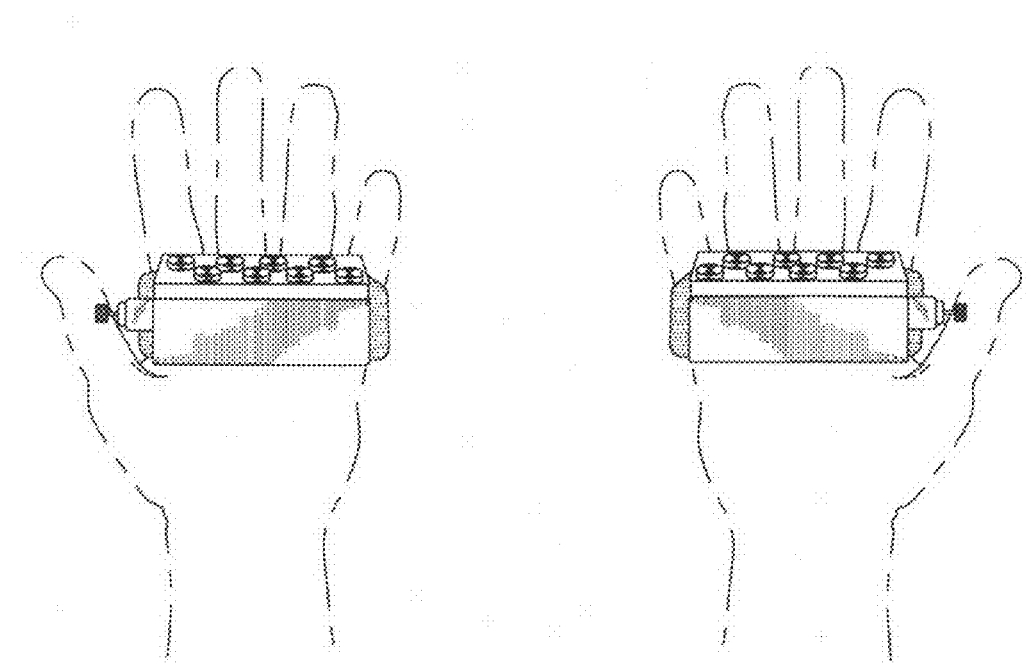
Fig. 15　　　　　　　　Fig. 16
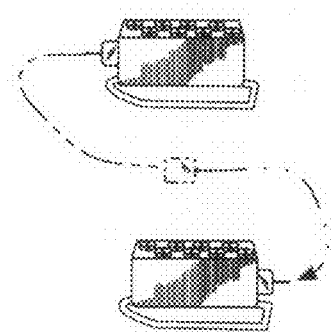
Fig. 17
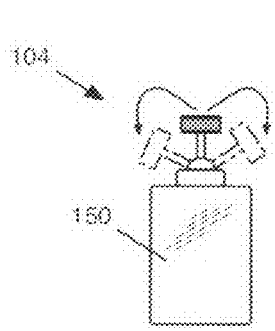 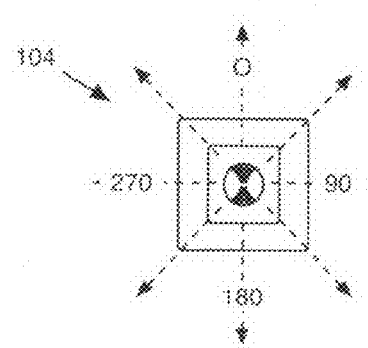 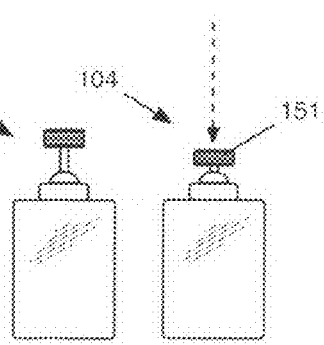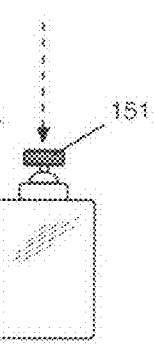
Fig. 18　　　　Fig. 19　　　　Fig. 20　　Fig. 21

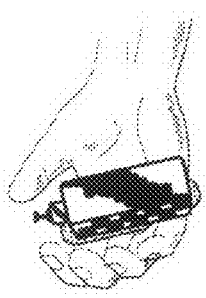
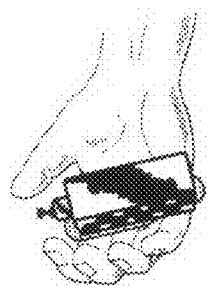
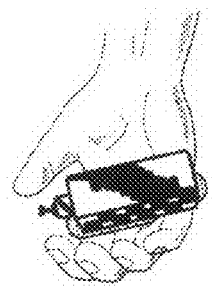
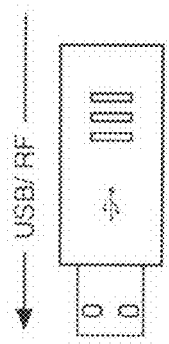
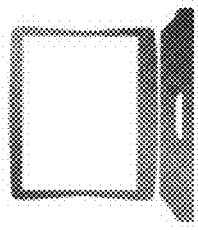
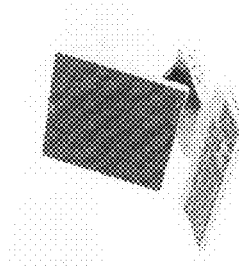
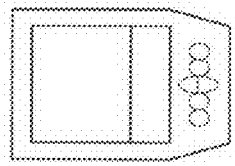
Fig. 22  Fig. 23  Fig. 24

HAND-WORN INTERFACE DEVICE

FIELD OF THE INVENTION

The present invention is in the area of computer accessories, and more particularly pertains to an apparatus for interfacing with various computers or similar devices.

BACKGROUND OF THE INVENTION

One of the difficulties which many people face with computers, personal digital assistants (PDA's) and related devices is the interface, or method of data-input into the receiving device. For instance, in many PDA's the OEM-issued keys are too small to be used for rapid and convenient use. Moreover, various touch screen interface devices are beset with similar difficulties which limit their effectiveness.

Another problem with most styles of data input into computers and related devices is that they typically require a user to physically sit or stand in front of a terminal which renders them completely stationary. This requirement becomes problematic when a user desires to multitask.

Another issue which inheres with the use of traditional QWERTY style keyboards is the ergonomic design. Many people are encumbered with various health related issues from the repetitive keystroke movements of their fingers interfacing with the keys which can lead to carpal tunnel syndrome in severe cases.

Therefore, what is clearly needed in the art is an apparatus which enables a user to interface with a computer while multi-tasking. The device should also be ergonomically friendly, user-programmable, and easy to use.

SUMMARY OF THE INVENTION

It is an object of the present invention to provide an apparatus to be used in conjunction with computers, PDA's, and related devices. The Device is used for the purpose of interfacing with computers, PDA's and similar devices by providing data input such as alphanumeric data.

It is an object of the present invention to enable a user to multitask by freeing up the use of a person's hand. The present invention incorporates angled keys in order to allow a person to pick up, grab, grasp, and generally use their hands for typical uses.

It is also an object of the present invention to provide an apparatus which limits the dangers, or complications presented by repetitive motion, and other carpal tunnel producing movements.

It is also an object of the present invention to provide an apparatus which is user-programmable and thus capable of communicating in a panoply of different languages. The present invention can also be used for various gaming programs and software.

BRIEF DESCRIPTION OF THE DRAWINGS FIGURES

Figure 1:
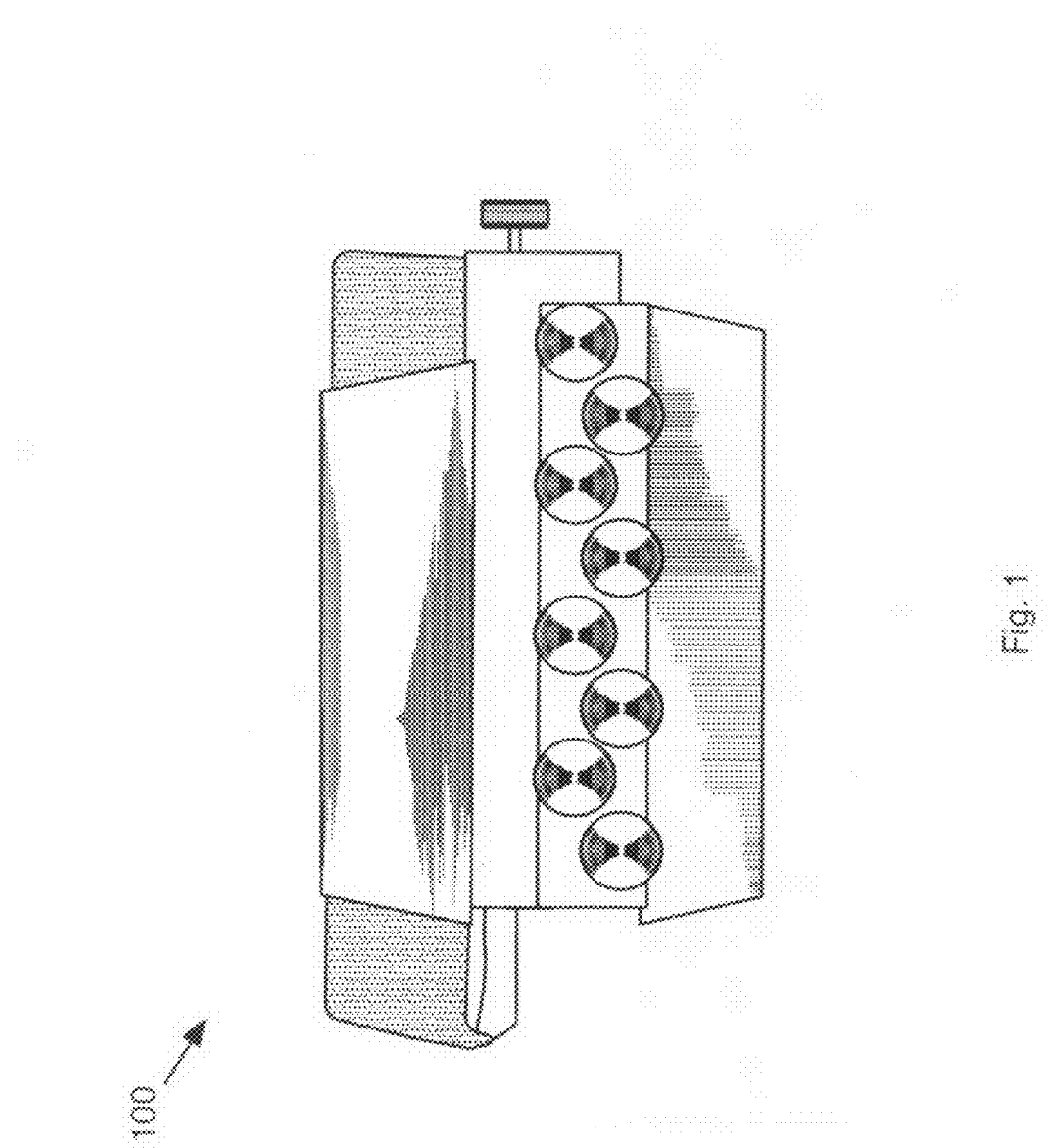
Figure 2:
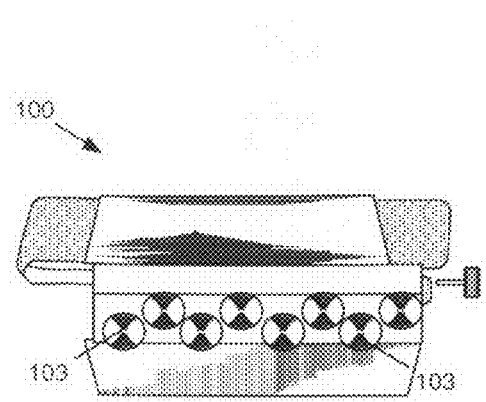
Figure 3:
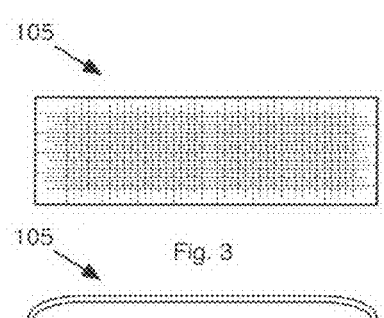
Figure 4:
Figure 5:
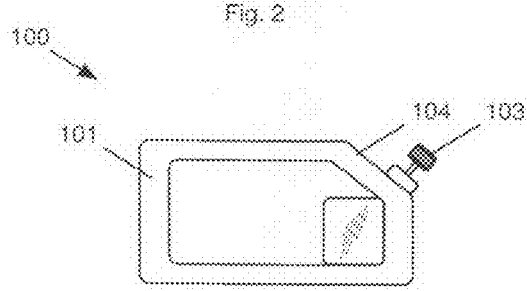
Figure 6:
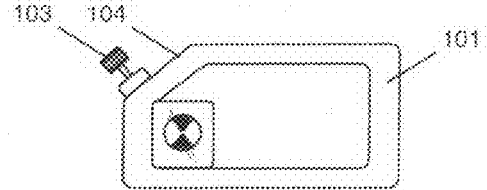
Figure 7:
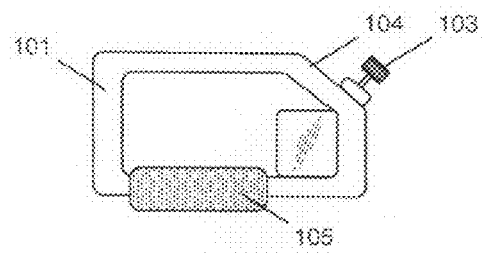
Figure 8:
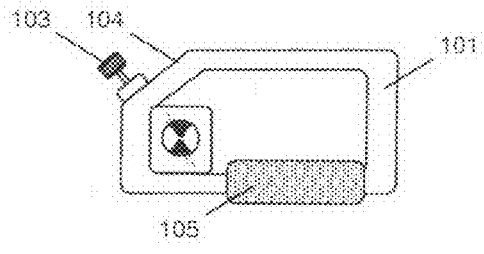
Figure 9:
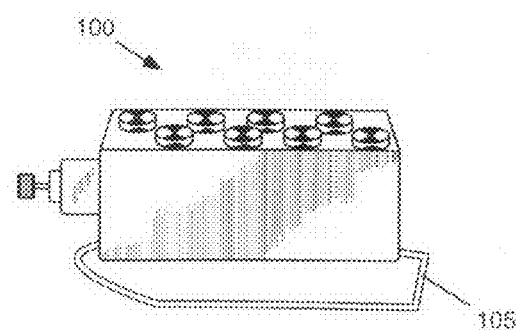
Figure 10:
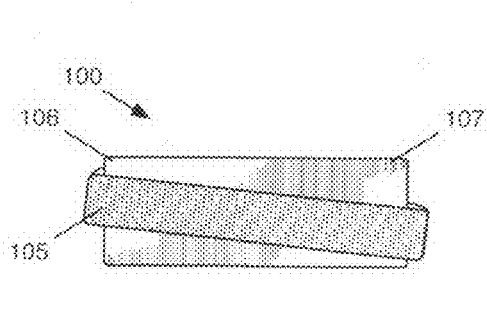
Figure 11:
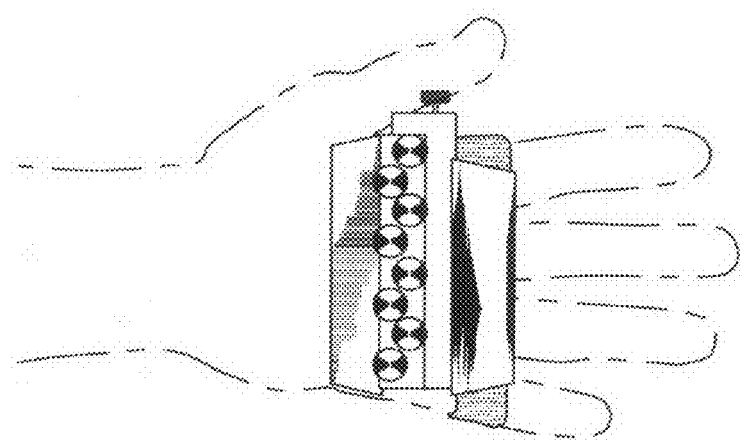
Figure 12:
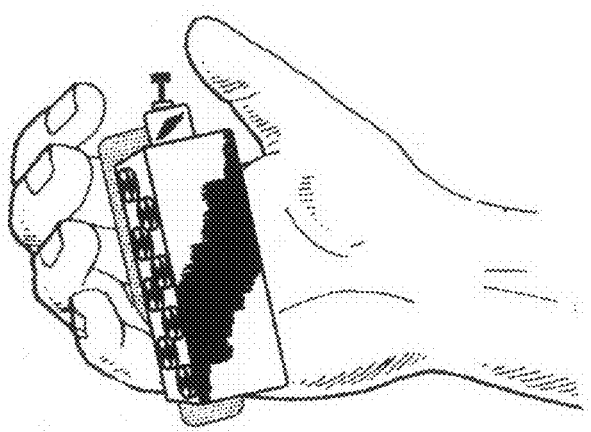
Figure 13:
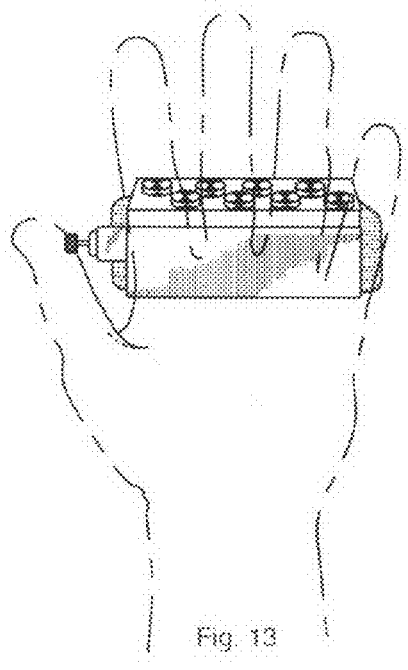
Figure 14:
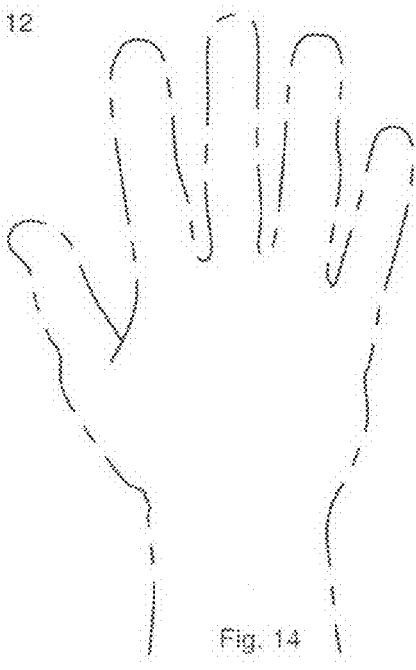
Figures 25, 26:
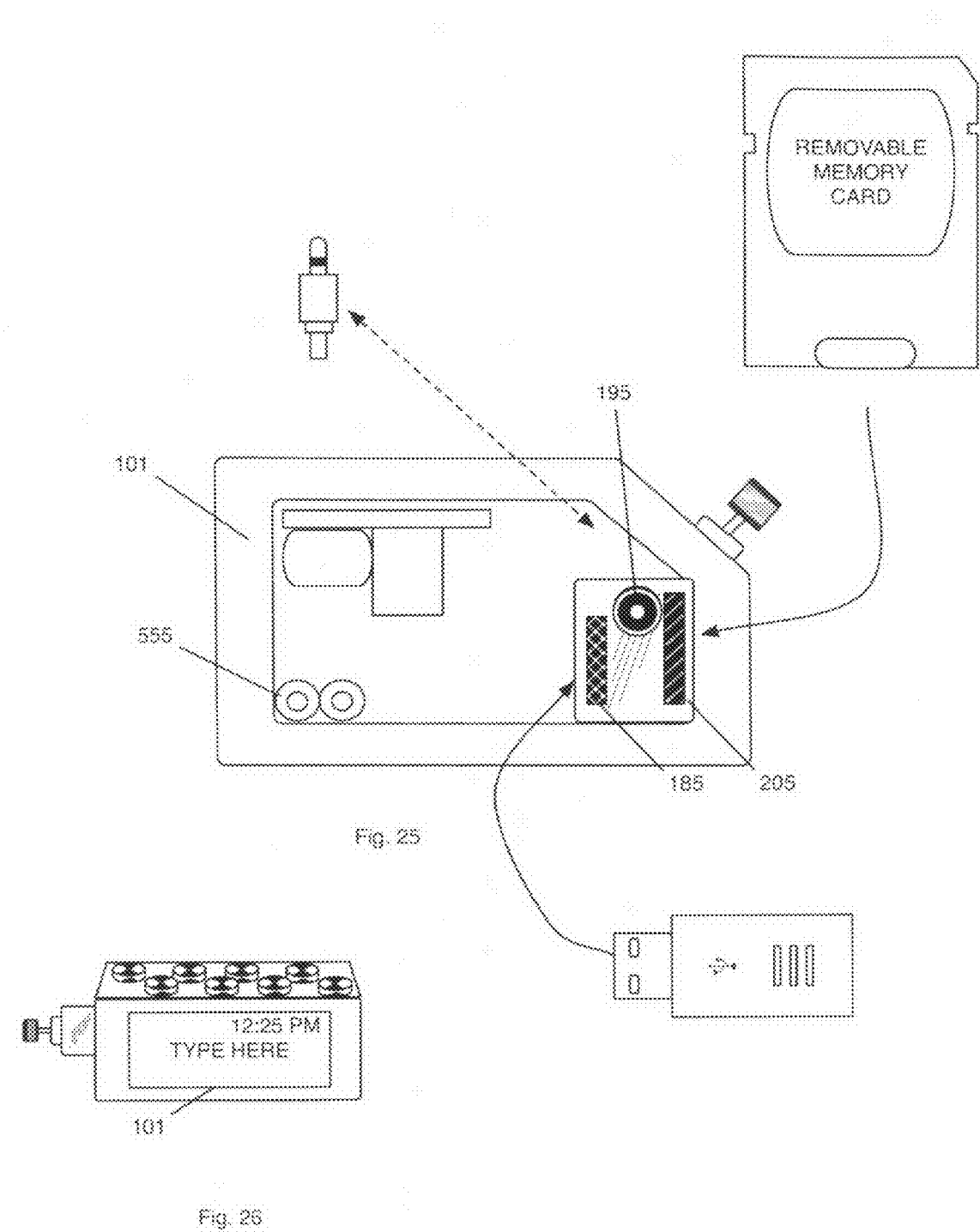
Figure 27:
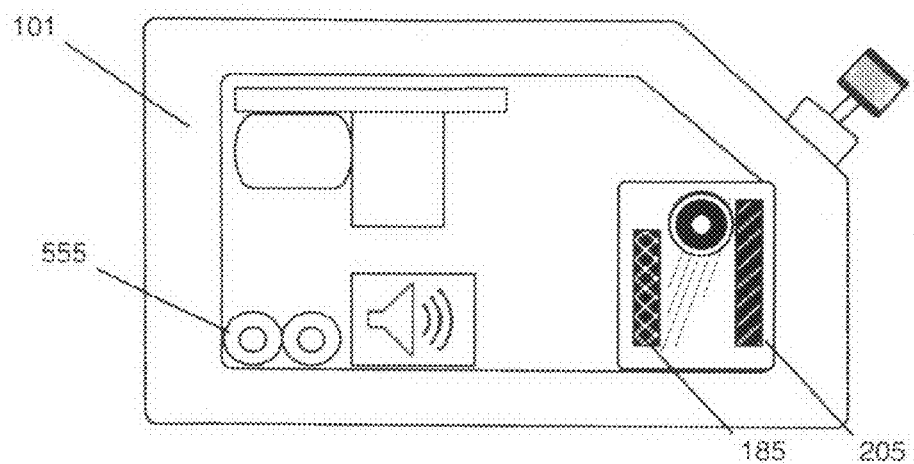
Figure 28:
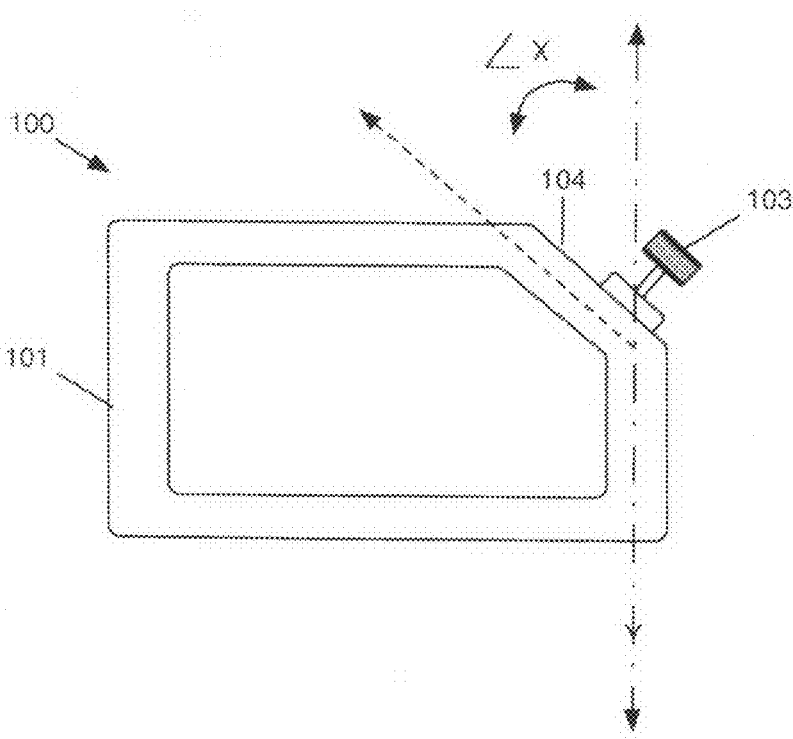

FIG. 1 is a side view of a preferred embodiment of the present invention.
FIG. 2 is a side view of a preferred embodiment of the present invention.
FIG. 3 is a side view of a preferred embodiment of the present invention.
FIG. 4 is a side view of a preferred embodiment of the present invention.
FIG. 5 is a rear view of a preferred embodiment of the present invention.
FIG. 6 is a plan view of a preferred embodiment of the present invention.
FIG. 7 is a plan view of a preferred embodiment of the present invention.
FIG. 8 is a side view of a preferred embodiment of the present invention.
FIG. 9 is a perspective view of a preferred embodiment of the present invention.
FIG. 10 is a side view of a preferred embodiment of the present invention.
FIG. 11 is a perspective view of a preferred embodiment of the present invention.
FIG. 12 is a frontal view of a preferred embodiment of the present invention.
FIG. 13 is a side view of a preferred embodiment of the present invention.
FIG. 14 is a side view of a preferred embodiment of the present invention.
FIG. 15 is a plan view of a preferred embodiment of the present invention.
FIG. 16 is a plan view of a preferred embodiment of the present invention.
FIG. 17 is a plan view of a preferred embodiment of the present invention.
FIG. 18 is a plan view of a preferred embodiment of the present invention.
FIG. 19 is a side view of a preferred embodiment of the present invention.
FIG. 20 is a side view of a preferred embodiment of the present invention.
FIG. 21 is a side view of a preferred embodiment of the present invention.
FIG. 22 is a plan view of a preferred embodiment of the present invention.
FIG. 23 is a plan view of a preferred embodiment of the present invention.
FIG. 24 is a plan view of a preferred embodiment of the present invention.
FIG. 25 is a plan view of a preferred embodiment of the present invention.
FIG. 26 is a side view of a preferred embodiment of the present invention.
FIG. 27 is a side view of a preferred embodiment of the present invention.
FIG. 28 is a side view of a preferred embodiment of the present invention.

DESCRIPTION OF PREFERRED EMBODIMENTS

According to a preferred embodiment of the present invention, a unique apparatus is used to interface with computers, PDA's, and similar devices. Although traditional alphanumeric inputs are the most common means of interfacing with a computer or similar device, other types of inputs may be used with the present invention.

It should be noted here that the present invention is user-programmable, and thus capable and adaptable for use with virtually any language or modalities of communication. Furthermore, the present invention may also be used for various gaming software or programs in some preferred embodiments. For this reason, the present invention should not be limited to data inputs requiring alphanumeric or other traditional language inputs, but should also include the use of various gaming functions as well. The present invention is described in enabling detail below.

FIG. 1 illustrates a preferred embodiment of the present invention. A Hand-Worn Ambidextrous Interface Device 100 for use with interfacing with a computer or similar device includes in some preferred embodiments a Housing 101, a plurality of Switches 103 and a Removable Three-Axis Joystick 104. In some preferred embodiments the Removable Three Axis Joystick 104 may control the cursor on the monitor or screen of the computer or related device to which it is communicating.

The Housing 101 comprises an Angled Face 102, an Anterior end 106 and a Posterior End 107. The plurality of Switches 103, and Removable Three-Axis Joystick104 are substantially disposed within the Housing 101. The plurality of Switches 103 are disposed on the Angled Face 102. In some preferred embodiments, the plurality of Switches 103 are Five-Switch Input Actuators. The Five-Switch Input Actuators provide at least five separate and distinct inputs: Down, 0, 90, 180, and 270.

In some preferred embodiments the Hand-Worn Ambidextrous Interface Device 100 may further comprise a Central Processing Unit 500 (hereafter CPU) for the purpose of processing user inputs, and for sending and receiving communication with the computer or related device. The CPU 500 is disposed within the Housing 101.

FIG. 28 illustrates that the Angled Face 102 is angled at away from Axis Y. This Angle X makes the Hand-Worn Ambidextrous Interface Device 100 more ergonomic and it also minimizes the tendency for accidentally triggering the plurality of Switches 103 of the Hand-Worn Ambidextrous Interface Device 100.

FIGS. 3-4 illustrate that in some preferred embodiments the Hand-Worn Ambidextrous Interface Device 100 may further include a Strap 105. The Strap 105 is used for the purpose of affixing the Hand-Worn Ambidextrous Interface Device 100 to the hand of a user. In some preferred embodiments, the Strap 105 may comprise loops and hooks material, commonly known as Velcro® (a Federally-Trademarked material). In some preferred embodiments the Strap 105 is affixed to the anterior end 106 and a posterior end 107 of the Housing 101.

FIGS. 18-21 illustrate that the Removable Three-Axis Joystick104 is comprised of a Base 150 and a Five-input Actuator 151. The Five-input Actuator 151 can provide at least five separate and distinct inputs: Down, 0, 90, 180, and 270. FIGS. 15-17 further illustrate how the Hand-Worn Ambidextrous Interface Device 100 is made ambidextrous by removing the Removable Three-Axis Joystick 104 and connecting the Removable Three-Axis Joystick 104 at the opposite side of the Housing 101.

FIGS. 25-26 illustrates that in some preferred embodiments the Hand-Worn Ambidextrous Interface Device 100 may further comprise a USB Port 185, LCD Display 175, an auditory apparatus 195, at least one Battery 555, a Blue-Tooth Communication Device 275, and a Port for a Removable Memory Card 205. The USB Port 185, LCD Display 175, an auditory apparatus 195, the Battery 555, the Blue-Tooth Communication Device 275, and the Port for a Removable Memory Card 205 are disposed within the Housing 101 in some preferred embodiments.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A HAND-WORN AMBIDEXTROUS INTERFACE DEVICE for use with interfacing with a computer or similar device comprising:
   a Housing, a plurality of Switches, a strap, and a Removable Three-Axis Joystick;
   the Housing comprises an anterior end and a posterior end;
   the anterior end is connectable to the removable three-axis joystick;
   the posterior end is connectable to the removable three-axis joystick;
   the strap is comprised of loops and hooks material;
   the Angled Face, plurality of Switches, and Removable Three-Axis Joystick are substantially disposed within the Housing;
   the plurality of Switches are disposed on the Angled Face.

2. The HAND-WORN INTERFACE DEVICE for use with interfacing with a computer or similar device of claim 1 further comprising a USB Port.

3. The HAND-WORN INTERFACE DEVICE for use with interfacing with a computer or similar device of claim 1 further comprising a Port for a Removable Memory Card.

4. The HAND-WORN INTERFACE DEVICE for use with interfacing with a computer or similar device of claim 1 further comprising an auditory apparatus for providing user-feedback.

5. The HAND-WORN INTERFACE DEVICE for use with interfacing with a computer or similar device of claim 1 further comprising an LCD Display.

6. The HAND-WORN INTERFACE DEVICE for use with interfacing with a computer or similar device of claim 1 further comprising a Blue-Tooth Communication Device.

7. The HAND-WORN INTERFACE DEVICE for use with interfacing with a computer or similar device of claim 1 wherein the plurality of Switches are Five-Switch Input Actuators.

8. The HAND-WORN INTERFACE DEVICE for use with interfacing with a computer or similar device of claim 1 wherein the Removable Three-Axis Joystick is comprised of a base and a Five-Input Actuator.

* * * * *